(12) United States Patent
Steininger et al.

(10) Patent No.: US 10,526,995 B2
(45) Date of Patent: Jan. 7, 2020

(54) FUEL INJECTION SYSTEM, FUEL INJECTION METHOD AND AUTOMOBILE

(71) Applicants: Hyundai Motor Company, Seoul (KR); Kia Motors Corporation, Seoul (KR)

(72) Inventors: Roland Steininger, Biblis (DE); Johannes Ullrich, Trebur (DE)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 132 days.

(21) Appl. No.: 15/801,159

(22) Filed: Nov. 1, 2017

(65) Prior Publication Data
US 2018/0355817 A1    Dec. 13, 2018

(30) Foreign Application Priority Data
Jun. 12, 2017    (DE) .................. 10-2017-209 836

(51) Int. Cl.
| | | |
|---|---|---|
| *F02D 41/40* | (2006.01) | |
| *F02M 65/00* | (2006.01) | |
| *F02M 61/16* | (2006.01) | |
| *F02M 63/00* | (2006.01) | |

(Continued)

(52) U.S. Cl.
CPC ......... *F02D 41/40* (2013.01); *F02M 61/161* (2013.01); *F02M 63/0015* (2013.01); *F02M 63/0028* (2013.01); *F02M 63/0031* (2013.01); *F02M 65/005* (2013.01); *F02D 2041/3052* (2013.01); *F02D 2200/063* (2013.01); *F02D 2200/0616* (2013.01); *F02M 57/005* (2013.01); *F02M 2200/24* (2013.01); *F02M 2200/9038* (2013.01)

(58) Field of Classification Search
CPC ............ F02D 41/40; F02D 2200/0616; F02D 2200/063; F02D 2041/3052; F02M 65/005; F02M 63/0031; F02M 63/0028; F02M 63/0015; F02M 61/161; F02M 2200/9038; F02M 2200/24; F02M 57/005
See application file for complete search history.

(56) References Cited

U.S. PATENT DOCUMENTS 4,461,427 A * 7/1984 Kopse .................. F02M 45/08
                                                              239/533.5
4,501,245 A * 2/1985 Taira .................... F02M 61/161
                                                                  123/446

(Continued)

*Primary Examiner* — Joseph J Dallo
(74) *Attorney, Agent, or Firm* — Morgan, Lewis & Bockius LLP

(57) ABSTRACT

A fuel injection system for fuel metering may include an injection nozzle, which includes a nozzle body, a nozzle needle, and a nozzle orifice, wherein nozzle needle is disposed in the nozzle body; a control piston configured to mechanically and electrically contact the nozzle needle in an axial direction opposite to the nozzle orifice; a transmitter configured to communicate with a controller and electrically contact the nozzle needle via the control piston; wherein the controller is configured to determine an open state and a closed state between the nozzle needle and the nozzle body via an electrical signal detected by the transmitter; and wherein the controller is configured to adjust the open state and the closed state in correlation with a fuel injection quantity.

12 Claims, 5 Drawing Sheets

(51) Int. Cl.
    *F02M 57/00*    (2006.01)
    *F02D 41/30*    (2006.01)

(56)     References Cited

U.S. PATENT DOCUMENTS

2002/0134865 A1*  9/2002  Rapp .................... F02M 61/161
                                                    239/533.2
2006/0123788 A1*  6/2006  Gobert .................... F01D 5/048
                                                      60/612
2014/0060492 A1*  3/2014  Woolvett ................ F02D 19/06
                                                     123/478

* cited by examiner

FUEL INJECTION SYSTEM, FUEL INJECTION METHOD AND AUTOMOBILE

CROSS-REFERENCE(S) TO RELATED APPLICATIONS

The present application claims priority to German Patent Application No. DE-10-2017-209836.8, filed on Jun. 12, 2017, the entire contents of which is incorporated herein for all purposes by this reference.

BACKGROUND OF THE INVENTION

Field of the Invention

The present invention relates to a fuel injection system, in particular, a diesel fuel injection system, a fuel injection method, and a vehicle including a fuel injection system.

Description of Related Art

Typically, a performance of a diesel engine in terms of emission and combustion noise can be strongly influenced by a position of a fuel injection metering by an engine management system operating the corresponding fuel injection nozzle. In particular, an accuracy of a small fuel injection quantity (smaller than two milligrams per stroke), so-called pilot injection quantities, can be highly important.

In other words, a metering and timing achieved by a signal from a conventional electronic control module (ECM) having a controlled beginning and a controlled pulse can be limited in its accuracy with respect to small injection quantities.

Document DE 10346220A1 relates to a fuel injected combustion engine with an exhaust gas treatment system for the addition of an emission reducing agent.

Consequently, there is a need to further improve a fuel injection system as well as a corresponding method.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various embodiments of the present invention relates to a fuel injection system, a fuel injection method, and a vehicle including a fuel injection system.

Various aspects of the present invention are directed to providing a fuel injection system for fuel metering, in particular a diesel injection system and for diesel metering, respectively.

The fuel injection system includes an injection nozzle. The injection nozzle includes a nozzle body, a nozzle needle, and a nozzle orifice, wherein the nozzle needle is disposed in the nozzle body. That is that the nozzle needle can be disposed in the nozzle body wherein the nozzle needle can be at least partially guided by the nozzle body. The fuel injection system further includes a control piston, which is configured to mechanically and electrically contact the nozzle needle in an axial direction opposite to the nozzle orifice.

The injection nozzle includes the nozzle needle operative to open or close the injection orifice by contacting the nozzle body as well as, for example, a two-way solenoid valve operative to control a fuel pressure acting on the nozzle needle.

During operation of the fuel injection system hydraulic forces can be applied to the control piston and the nozzle needle. The corresponding hydraulic forces can be applied on two opposite sides of the fuel injection system. Therefore, a reliable functionality of the fuel injection system can be ensured. The control piston can be mechanically contacted to the nozzle needle via the hydraulic forces and can also be in electronic contact based on electrically conducting materials of the control piston and the nozzle needle, respectively.

The fuel injection system includes a transmitter, which is configured to communicate with a controller and which is configured to electrically contact the nozzle needle via the control piston. In other words, the transmitter is disposed in a portion adjacent to the control piston, wherein the control piston is configured to, electrically connect the transmitter with the nozzle needle.

The controller of the fuel injection system is configured to determine an open state and a closed state between the nozzle needle and the nozzle body via an electrical signal detected by the transmitter. The electrical signal can be a time dependent voltage pulse, for example. The controller, for example an electronic control unit (ECU), is also simultaneously configured to adjust the open state and the closed state between the nozzle needle and the nozzle body in correlation with a fuel injection quantity.

That is, that the transmitter can be monitored and processed by the controller. The controller can be, in particular, an adapted control logic integrated in an engine, the electronic control unit (ECU) of a vehicle, or individual microelectronic system.

A further aspect of the invention relates to a fuel injection method. The method includes a step of contacting a control piston with a nozzle needle in an axial direction opposite to a nozzle orifice, wherein the nozzle needle is guided within the nozzle body. The method further includes a step of electrically contacting a transmitter with the nozzle needle via the control piston, wherein the transmitter communicates with a controller. The method further includes determining an open state and a closed state between the nozzle needle and the nozzle body with the controller via an electrical signal detected by the transmitter. The method also includes a step of adjusting the open state and the closed state in correlation with a fuel injection quantity via the controller.

Various aspects of the present invention are directed to providing a vehicle, which includes at least one of the here described fuel injection systems.

The idea of the invention is directed to providing an evaluation of the electrical signal inside the fuel injection system by determination of an opening or closing of the nozzle needle in relation to the nozzle body, wherein a contact time, or duration, between the open or closed state can be correlated with the fuel injection quantity.

The here described controller can be configured to operate the fuel injection system efficiently. In other words, the controller can be configured to manage a closed loop and an open loop of the fuel injection system via a precise nozzle needle control.

According to an exemplary embodiment of the present invention, an adjusting shim can be disposed between the nozzle needle and the control piston. The adjusting shim is configured to compensate tolerances between the nozzle needle and the control piston and to electrically contact the nozzle needle with the control piston. The adjusting shim can be an optional component of the fuel injection system.

By use of the adjusting shim, the fuel injection system can be provided in a cost efficient manner.

According to a further exemplary embodiment of the present invention, the controller can be configured to be driven with a supply voltage between 0.1 V and 24.0 V, preferably between 0.8 V and 6.0 V, and more preferably between 1.6 V and 2.4 V. Surprisingly, it was found that within these supply voltage ranges the accuracy and reliability of the electrical signal detected by the transmitter of the fuel injection system can be optimized.

Too low a voltage can influence a signal to noise ratio and result in a limited accuracy of a fuel metering process. In contrast, too high a voltage can result in discharge across a fuel film as well as a spark erosion phenomena and increased wear between the transmitter and control piston. Further, it was revealed that a slightly damaged electrically insulating coating can be recovered after switching off and/or on a supply voltage via the controller.

According to a further exemplary embodiment of the present invention, the fuel injection system includes a fuel supply. The fuel supply may include a fuel connection which can be connected to a fuel supply pipe. Therefore, the fuel, for the injection nozzle and the nozzle needle, respectively, can be supplied. Therefore, the injection quantity can be precisely determined by the controller since the pressure in the injection nozzle can be maintained substantially constant.

According to a further exemplary embodiment of the present invention, a radial surface of the nozzle needle, the adjusting shim, and the control piston are at least partially electrically insulated. Therefore, a discharge of the fuel injection system can be efficiently prevented. For example, the discharge between the control piston and injector body as well as the nozzle needle and the nozzle body can be prevented. It is clear from the context that to generate the detected electrical signal an area of the nozzle needle, including a nozzle tip and the contact area of the control piston, which is configured to at least electrically contact the transmitter are free of an electrically insulating material to ensure the functionality of the fuel injection system.

According to a further exemplary embodiment of the present invention, the transmitter includes a guide, wherein a contact element is disposed in the guide and the guide is disposed in a plug. Therefore, the transmitter can be easily disposed or mounted to electrically contact the control piston, wherein the control piston is electrically contacted with the nozzle needle in the axial direction thereof. For example, the plug may include screw threads, which can be configured to screw the transmitter in the injector body. The contact element can be a wire, for example a swing contact wire, which can adapt its form to a specific geometry of the control piston. The wire may include a diameter between 0.08 mm and 1.2 mm, and a length between 2.5 mm and 9.5 mm. For example, the contact element can be reversibly deformed or twisted when it gets in contact with the control piston.

According to a further exemplary embodiment of the present invention, the contact area of the control piston includes a smaller diameter, wherein the transmitter is disposed wherein the contact element can be positioned at the contact area. For example, the smaller diameter is smaller than a main diameter of the control piston, wherein the contact area can be a transition zone between the main diameter and the smaller diameter of the control piston. Therefore, the transition zone between the two diameters can be configured to guide the contact element to its predetermined position at the control piston. The control piston can be disposed in an injector body.

According to a further exemplary embodiment the contact element includes a spring steel. Spring steels are a low-alloy, medium-carbon steel or high-carbon steel with a very high yield strength. The present properties allow the contact element to return to its original shape. The spring steel can inter alia include carbon in a range between 0.1% and 1.2%, silicon in a range between 0.1% and 1.5%, and molybdenum in range between 0.1% and 1.9%. Beside steel, any other metal alloy or material which has elastic properties as well as electrical conductivity can be configured as the contact element.

According to a further exemplary embodiment of the present invention, the transmitter can be disposed external to a cylinder head. Preferably the controller can also be disposed external to the cylinder head. The cylinder head can be a member of a corresponding cylinder assembly of an engine compartment. The here described fuel injection system allows without any additional internal injector wire to set the transmitter on a top side of a cylinder head. Therefore, package problems within the cylinder head or extra cost of wiring can be avoided.

The here described fuel injection system is configured such that the transmitter can be disposed to the control piston in any radial direction, preferably external to the cylinder head and cylinder assembly, respectively.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
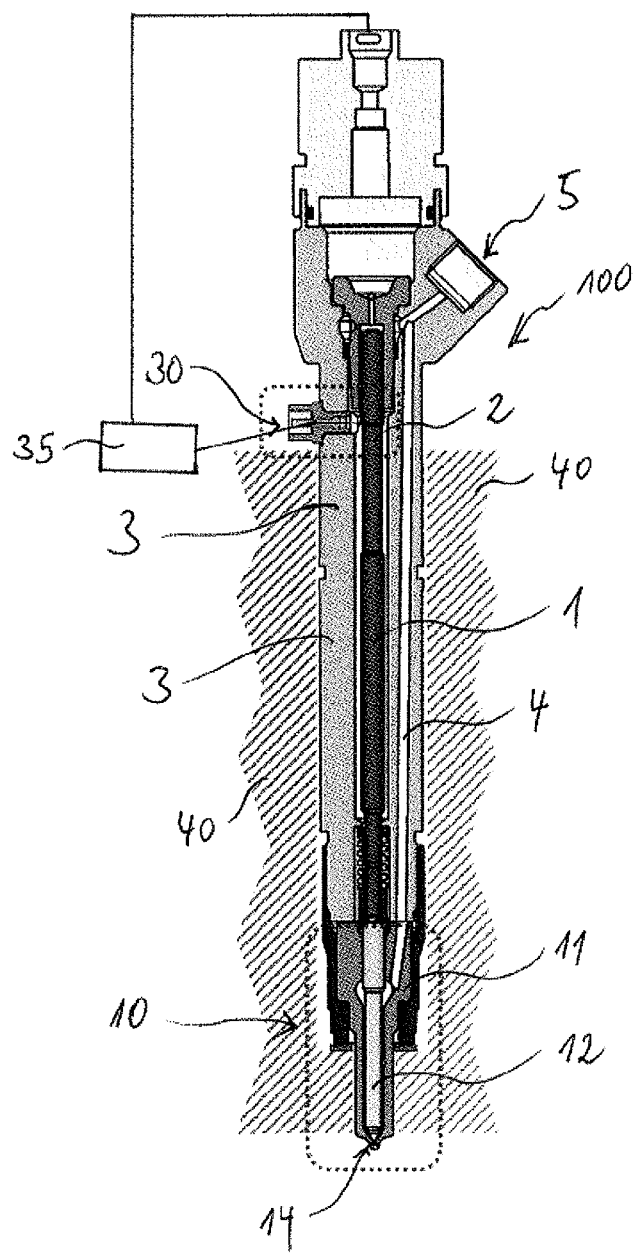
FIG. 1 shows a cross sectional view of a fuel injection system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 shows a cross sectional view of a fuel injection system according to an exemplary embodiment of the invention.

Reference number 100 relates to the fuel injection system. The fuel injection system 100 for fuel metering includes an injection nozzle 10, which includes a nozzle body 11, a nozzle needle 12, and a nozzle orifice 14, wherein the nozzle body 11 can be configured to guide the nozzle needle 12 within the nozzle body 11. The fuel injection system 100 further includes a control piston 1 configured to mechanically and electrically contact the nozzle needle 12 in an axial direction opposite to the nozzle orifice 14. The contact between the nozzle needle 12 and the control piston 1 can be maintained based on hydraulic forces F1 during operation of the fuel injection system 100. The corresponding hydraulic forces F1 can be applied on two opposite sides of the fuel injection system 100 (see FIG. 2). The fuel injection system 100 further includes a transmitter 30, which is configured to communicate with a controller 35 and which is configured to electrically contact the nozzle needle 12 via the control piston 1. That is, the control piston 1 additionally includes a function as a conductive bridge. The controller 35 of the fuel injection system 100 is configured to determine an open state P1 and a closed state P2 between the nozzle needle 12 and the nozzle body 11 via an electrical signal detected or determined by the transmitter 30, wherein the controller 35 can be configured to adjust the open state P1 and the closed state P2 by regulating a contact time, or rather duration, between the nozzle needle 12 and the nozzle body 11 in correlation with a fuel injection quantity.

The fuel injection system 100 is at least partially disposed within a cylinder head 40, wherein the transmitter 30 is disposed external to the cylinder head 40. The cylinder head 40 can be a portion of a corresponding cylinder assembly of an engine compartment 50. The fuel injection system 100 includes a fuel supply 4. The fuel supply 4 may include a fuel connection 5 which can be connected to a fuel supply pipe. The control piston 1 can be disposed in an injector body 3.

Figure 2:
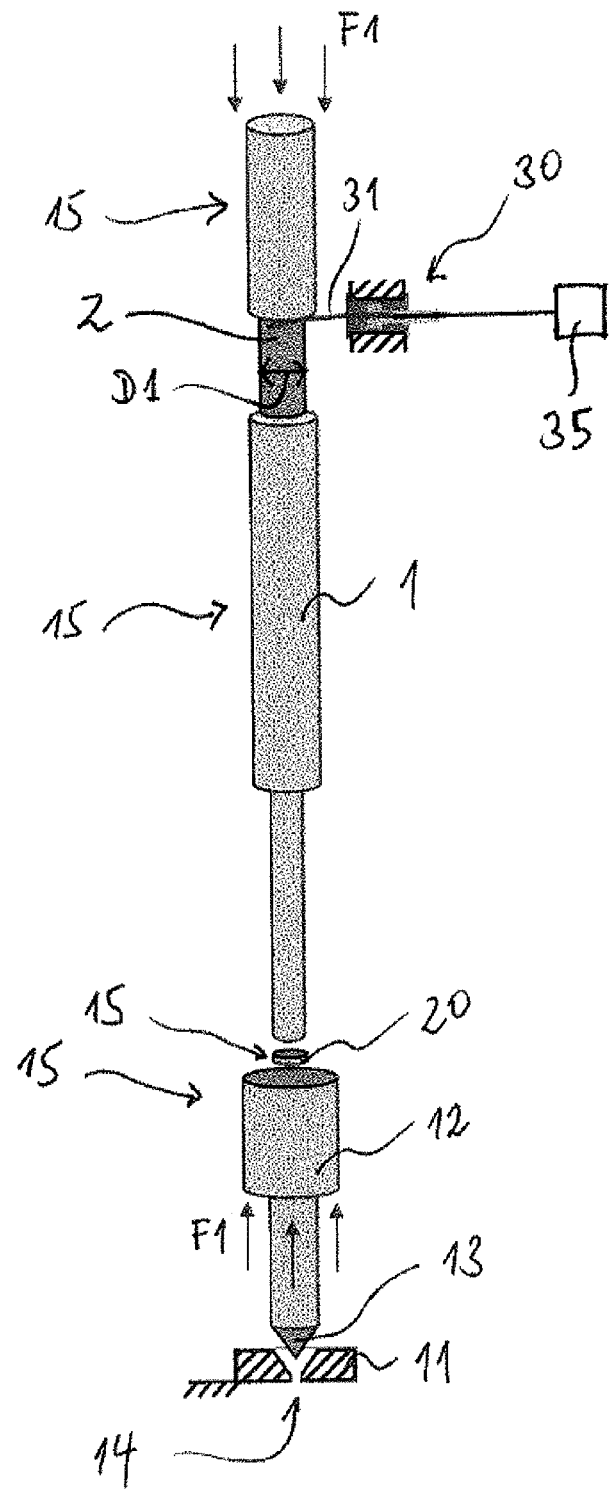
FIG. 2 shows a schematic partial cross sectional view of the fuel injection system based on a FIG. 1.

FIG. 2 shows a schematic cross sectional view of the fuel injection system based on a FIG. 1.

FIG. 2 shows an enlarged schematic cross sectional view of the transmitter 30, the controller 35, the control piston 1, an adjusting shim 20, and the injection nozzle 10.

The adjusting shim 20 can be an optional component of the fuel injection system 100. The adjusting shim 20 is configured to compensate tolerances between the nozzle needle 12 and the control piston 1. The control piston 1 may include a contact area 2 with a diameter D1, wherein the transmitter 30 is disposed so that a contact element 31 of the transmitter 30 is disposed or disposed at the contact area 2. For example, the diameter D1 is smaller than a main diameter of the control piston 1, wherein the contact area 2 is configured as a transition zone between the main diameter and the smaller diameter D1 of the control piston 1. The transition zone between the two different diameters can be configured to guide the contact element 31 to a predetermined position at the control piston 1. For example, the contact element 31 includes a spring steel and can be a wire.

It is clear from the context that to generate the electrical signal detected by the transmitter 30, an area of the nozzle needle 12, including a nozzle tip 13 and the contact area 2 of the control piston 1, which is configured to at least electrically contact the transmitter 30 are free of an electrically insulating material to ensure the functionality of the fuel injection system 100.

A radial surface of the nozzle needle 12, the adjusting shim 20, and the control piston 1 includes at least partially an electrical insulation 15. Therefore, discharge during operation of the fuel injection system 100 can be efficiently prevented. For example, discharge between the control piston 1 and the injector body 3 as well as between the nozzle needle 12 and the nozzle body 11 can be prevented.

Figure 3:
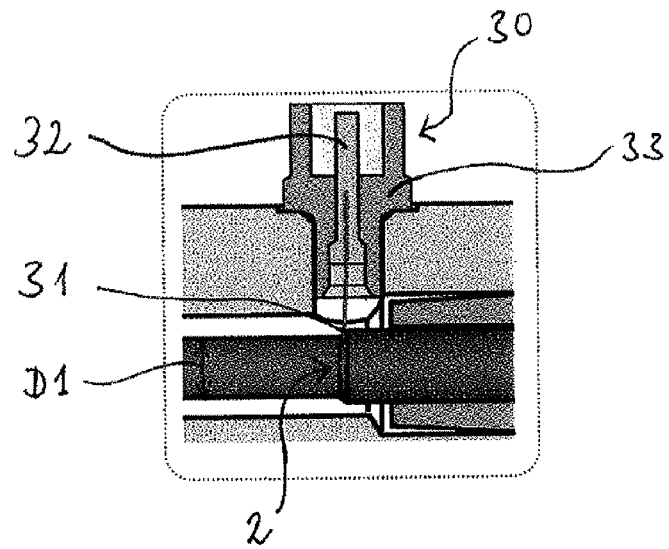
FIG. 3 shows an enlarged cross sectional view of a transmitter of the fuel injection system according to an exemplary embodiment of the present invention.

FIG. 3 shows an enlarged cross-sectional view of the transmitter of the fuel injection system 100 according to an exemplary embodiment of the invention.

FIG. 3 shows the enlarged cross-sectional view of the transmitter 30 as shown in FIG. 2. The transmitter 30 includes the contact element 31, a guide 32, and a plug 33. The contact elements 31 can be disposed in the guide 32, wherein the guide 32 can be disposed in the plug 33. Therefore, the transmitter 30 can be easily disposed, mounted, or electrically connected to the contact area 2 of the control piston 1.

Figure 4A:
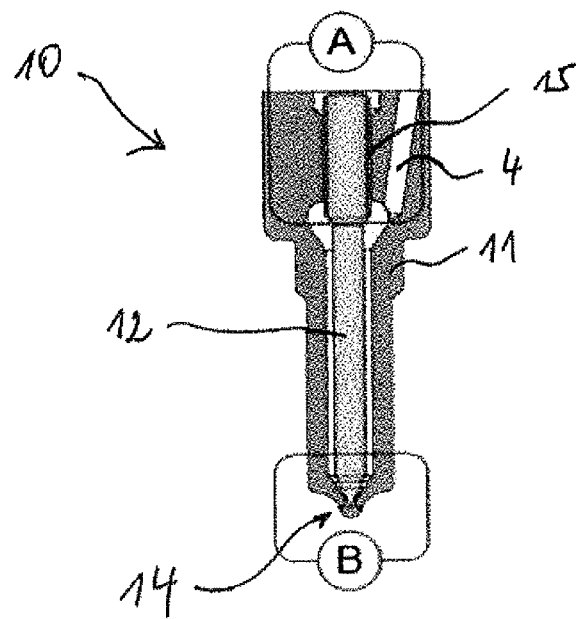
FIG. 4A shows an cross sectional view of an injection nozzle according to an exemplary embodiment of the present invention.

FIG. 4A shows a cross-sectional view of the injection nozzle according to an exemplary embodiment of the invention.

Figure 4B:
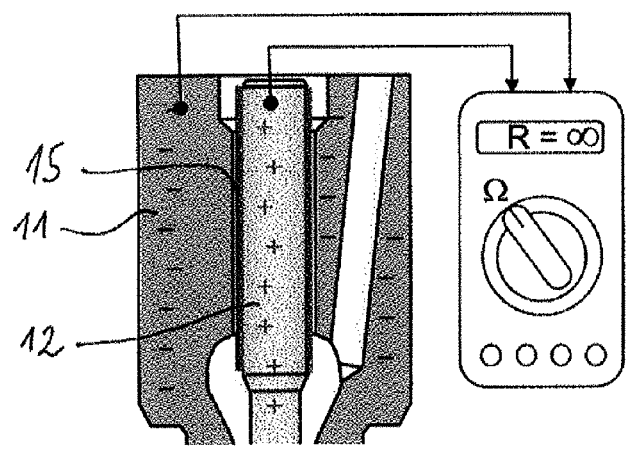
FIG. 4B shows an enlarged cross sectional view of the injection nozzle based on FIG. 4A.
Figure 4C:
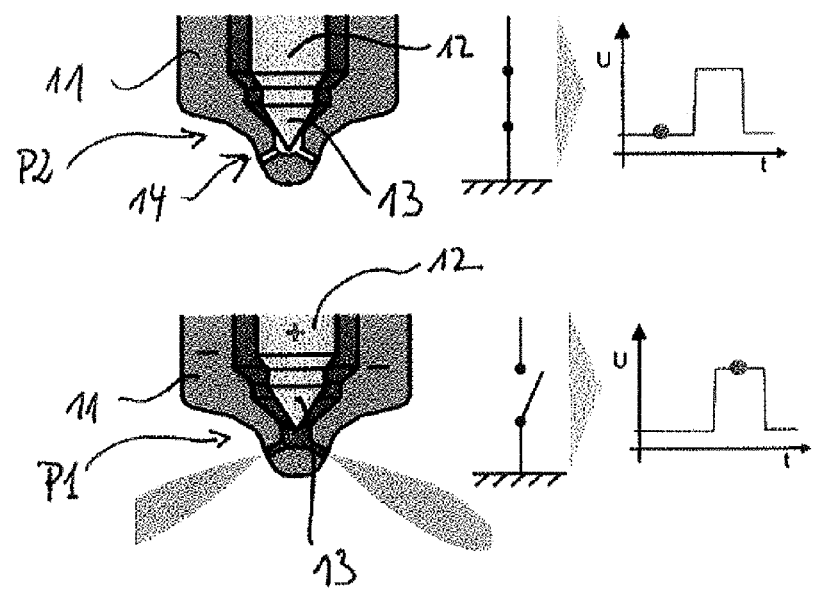
FIG. 4C shows an enlarged cross sectional view of the injection nozzle based on FIG. 4A.

FIG. 4A shows areas A and B, wherein the areas A and B correspond to enlarged cross-sectional views of FIG. 4B and FIG. 4C, respectively, of the here described injection nozzle 10. The injection nozzle 10 includes the nozzle body 11, the nozzle needle 12, and the nozzle orifice 14.

FIG. 4B shows an enlarged cross-sectional view of FIG. 4A with reference to area of the injection nozzle 10 shown in FIG. 4A. Reference number 15 in FIG. 4B relates to an electrical insulation between the nozzle needle 12 and the nozzle body 11. Therefore, the resistance between the nozzle body 11 and the nozzle needle 12 can be substantially infinite. In other words, a discharge between the nozzle body 11 and nozzle needle 12 in the radial direction or lateral direction can be efficiently prevented and a reliable functionality of the here described fuel injection system 100 can be ensured.

FIG. 4C shows an enlarged cross sectional view of the area B based on FIG. 4A, wherein, in particular, the nozzle orifice 14 is shown in detail.

FIG. 4C shows the close state P2, wherein the detected electrical signal cannot be detected due to a discharge between the nozzle body and the nozzle needle. That is, the nozzle tip 13 is in contact with the nozzle body 11. The nozzle tip 13 is free of the electrical insulation 15.

In contrast, FIG. 4C also shows the open state P1 between the nozzle needle 12, or rather the nozzle tip 13 and the nozzle body 11, wherein the detected electrical signal can be, for example, a voltage or a pulse. The detected electrical signal can be detected in relation to time and duration, respectively, as shown in the corresponding graphs and corresponding schematic circuit diagrams of FIG. 4C. In the graphs the y-axis corresponds to the detected electrical signal, including voltage or voltage pulse, and the x-axis corresponds to time. In other words, during the open state P1 the pressurized fuel exits the nozzle orifice 14 in a corresponding combustion chamber.

Figure 5:
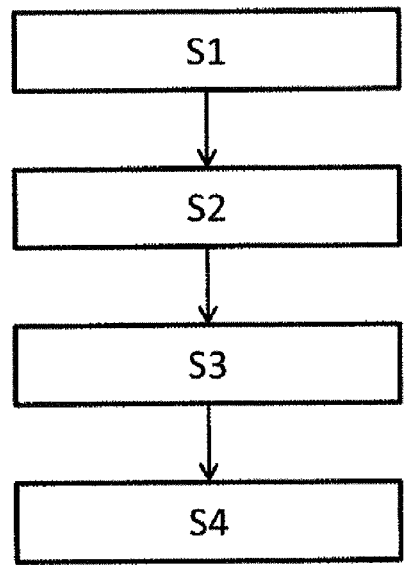
FIG. 5 shows a flowchart diagram of a fuel injection method according to an exemplary embodiment of the present invention.

FIG. 5 shows a flow diagram of the fuel injection method according to an exemplary embodiment of the invention.

The fuel injection method includes the steps S1 to S4.

The first step S1 includes contacting the control piston 1 with the nozzle needle 12 in the axial direction opposite to the nozzle orifice 14, wherein the nozzle needle 12 is guided within the nozzle body 11. The second step S2 includes electrically contacting the transmitter 30 with the nozzle needle 12 via the control piston 1, wherein the transmitter 30 communicates with the controller 35. The third step S3 includes determining an open state P1 and the closed date P2 between the nozzle needle 12 and the nozzle body 11 using the controller 35 via an electrical signal detected by the transmitter 30. The step S4 includes adjusting the open state P1 and the closed state P2 in correlation with a fuel injection quantity via the controller 35.

The step S3 of determining the open state P1 and the closed state P2 via the detected electrical signal with the transmitter 30 may include operating the transmitter 30 with a supply voltage between 0.1 V and 24.0 V.

Figure 6:
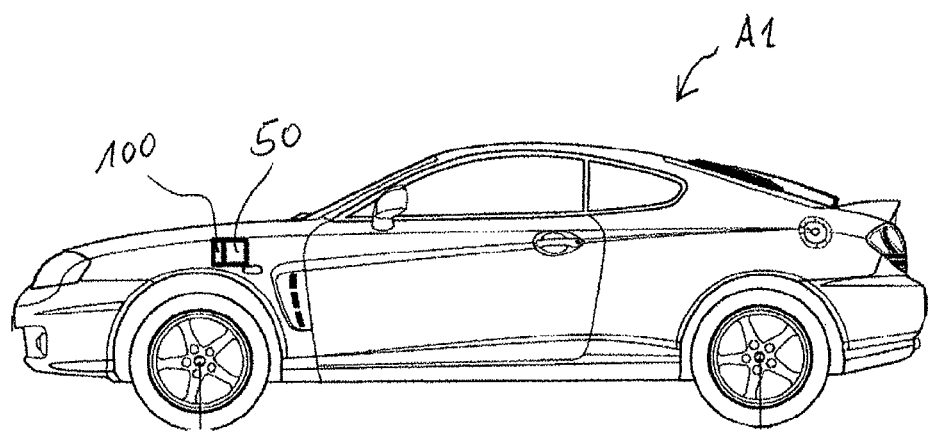
FIG. 6 shows a vehicle according to an exemplary embodiment of the present invention.

FIG. 6 shows a vehicle according to an exemplary embodiment of the invention.

Reference sign A1 shows the vehicle. The vehicle A1 includes the engine compartment 50, wherein the engine compartment 50 includes the here described fuel injection system 100.

With the here described fuel injection system as well as the here described method, cost for exhaust gas after treatment can be reduced due to a better engine emission output. Further, quieter engine combustion noise can cause higher customer satisfaction and lower a risk for a field complaint. Therefore, better emission compliance in the field due to lower dispersion and better stability of a vehicle's emission over an entire service life can be provided.

Although the here afore-mentioned fuel injection system has been described with reference to vehicles, accordingly. For a person skilled in the art it is clearly and unambiguously understood that the here described fuel injection system can be applied to various objects which include combustion engines, in particular, diesel combustion engines.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel injection system for fuel metering, the fuel injection system comprising:
   an injection nozzle, which includes a nozzle body, a nozzle needle, and a nozzle orifice, wherein the nozzle needle is disposed in the nozzle body;
   a control piston configured to mechanically and electrically contact the nozzle needle in an axial direction thereof opposite to the nozzle orifice; and
   a transmitter configured to communicate with a controller and electrically contact the nozzle needle via the control piston;
   wherein the controller is configured to determine an open state and a closed state between the nozzle needle and the nozzle body via an electrical signal detected by the transmitter, and
   wherein the controller is configured to adjust the open state and the closed state in correlation with a fuel injection quantity.

2. The fuel injection system according to claim 1, wherein an adjusting shim is disposed between the nozzle needle and the control piston.

3. The fuel injection system according to claim 1, wherein the transmitter is configured to be driven with a supply voltage between 0.1 V and 24.0 V.

4. The fuel injection system according to claim 1, wherein the fuel injection system includes a fuel supply.

5. The fuel injection system according to claim 2, Wherein a radial surface of the nozzle needle, the adjusting shim and the control piston are at least partially electrically insulated.

6. The fuel injection system according to claim 1, wherein the transmitter includes a guide, wherein a contact element is disposed in the guide and the guide is disposed in a plug.

7. The fuel injection system according to claim 6, wherein a contact area of the control piston includes a smaller diameter, wherein the transmitter is disposed so that the contact element is positioned at the contact area.

8. The fuel injection system according to claim 6, wherein the contact element includes a spring steel.

9. The fuel injection system according to claim 1, wherein the transmitter is disposed external to a cylinder head.

10. A fuel injection method, the method comprising the steps:
    contacting a control piston with a nozzle needle in an axial direction thereof opposite to a nozzle orifice, wherein the nozzle needle is guided within a nozzle body;
    electrically contacting a transmitter with the nozzle needle via the control piston, wherein the transmitter communicates with a controller;
    determining an open state and a closed state between the nozzle needle and the nozzle body with the controller via an electrical signal detected by the transmitter; and
    adjusting the open state and the closed state in correlation with a fuel injection quantity via the controller.

11. The fuel injection method according to claim 10, wherein determining the open state and the closed state via the detected electrical signal with the transmitter includes operating the transmitter with a supply voltage between 0.1 V and 24.0 V.

12. A vehicle including the fuel injection system according to claim 1.

* * * * *